United States Patent [19]

Kondo et al.

[11] Patent Number: 5,198,896
[45] Date of Patent: Mar. 30, 1993

[54] MOVEMENT DETECTION APPARATUS FOR DETECTING MOVEMENT VECTORS FROM AN IMAGE SIGNAL

[75] Inventors: Toshiaki Kondo, Kanagawa; Masayoshi Sekine, Tokyo, both of Japan

[73] Assignee: Canon Kabushiki Kaisha, Tokyo, Japan

[21] Appl. No.: 925,247

[22] Filed: Jul. 31, 1992

Related U.S. Application Data

[63] Continuation of Ser. No. 853,896, Mar. 19, 1992, which is a continuation of Ser. No. 601,926, Oct. 23, 1990.

[30] Foreign Application Priority Data

Oct. 26, 1989 [JP] Japan .................................. 1-279582
Oct. 26, 1989 [JP] Japan .................................. 1-279583
Oct. 26, 1989 [JP] Japan .................................. 1-279584

[51] Int. Cl.⁵ .............................................. H04N 7/18
[52] U.S. Cl. ...................................... 358/105; 358/222
[58] Field of Search ............... 358/105, 222, 108, 125, 358/126, 136

[56] References Cited

U.S. PATENT DOCUMENTS

| | | | |
|---|---|---|---|
| 4,692,806 | 9/1987 | Anderson et al. | 358/108 X |
| 4,739,401 | 4/1988 | Sacks et al. | 358/105 X |
| 4,996,594 | 2/1991 | Murayama | 358/105 X |
| 5,107,293 | 4/1992 | Sekine et al. | 354/430 |
| 5,128,768 | 7/1992 | Sada et al. | 358/227 |

*Primary Examiner*—Victor R. Kostak
*Attorney, Agent, or Firm*—Robin, Blecker, Daley & Driscoll

[57] ABSTRACT

A movement vector detecting apparatus includes an area decision circuit for calculating a movement vector from a signal filtered through a first preprocessing filter and deciding an image area for obtaining a target movement vector, and a movement vector operation circuit for calculating a movement vector associated with the image area in accordance with a signal filtered through a second preprocessing filter and under the control of the area decision circuit.

41 Claims, 11 Drawing Sheets

FIG. 10

| | CALCULATION RESULT e(α) | | | | |
|---|---|---|---|---|---|
| Period of extracted image | $-\frac{T}{2\pi}$ | $-\frac{T}{4\pi}$ | 0 | $\frac{T}{4\pi}$ | $\frac{T}{2\pi}$ |
| 26 | $-\frac{26}{4}$ | $-\frac{26}{8}$ | 0 | $\frac{26}{8}$ | $\frac{26}{4}$ |
| 40 | −10 | −5 | 0 | 5 | 10 |
| 80 | −20 | −10 | 0 | 10 | 20 |

MOVEMENT DETECTION APPARATUS FOR DETECTING MOVEMENT VECTORS FROM AN IMAGE SIGNAL

This is a continuation application under 37 CFR 1.62 of prior application Ser. No. 07/853,896, filed Mar. 19, 1992, which is a continuation of 07/601,926 filed Oct. 23, 1990.

BACKGROUND OF THE INVENTION

1. Field of the Invention

The present invention relates to a movement vector detection apparatus and, more particularly, to an apparatus for detecting movement vectors from an image signal.

2. Related Background Art

In the field of image pickup apparatuses for correcting vibrations of a video camera, detecting panning of a video camera, or detecting and tracing a movement of a specific image in a video camera, movements and kinds of movements of images must be accurately detected from image signals output from an image pickup means such as an image pickup device.

For example, an image vibration detection apparatus cannot distinguish a local movement of an object from a vibration of the entire field of view. In order to make it possible to distinguish a local movement from a vibration of the entire field of view, different detection sensitivities for image vibration amounts must be distributed within a frame area.

A conventional image vibration detection apparatus proposed in consideration of the above drawback is exemplified as an image vibration correction apparatus described in the Society of Television Techniques, Technical Report Vo. 11, No. 3, pp. 43-48, PPOE, '87-12 (May, 1987). In this apparatus, the entire frame is divided into 140 blocks, vibration detection blocks are arbitrarily turned on/off, and a representative point matching is performed for only vibration detection ON blocks.

The present applicant filed a movement detection apparatus as U.S. and EPC applications on Mar. 6, 1989 (U.S. patent application Ser. No. 319,658).

Movement vector detection methods using image signal processing are exemplified as a time and spatial gradient method described in Japanese Patent Publication No. 60-46878 and J. O. Limb and J. A. Murphy, "Measuring the Speed of Moving Objects from Television Signals", *IEEE Trans. Com.*, Com-23, 4, p.p. 474-478 (April, 1975), or a matching method described in "MUSE Movement Vector Detection Apparatus", the Society of Television Technics, *Technical Report* p.p. 25-30 (issue date: May 24, 1985, Friday).

According to the time and spatial gradient method, a movement amount of each point is calculated by the following equations:

$$\alpha = \Sigma_B d \cdot \text{sign}(g'_x)/\Sigma_B |g'_x|$$

$$\beta = \Sigma_B d \cdot \text{sign}(g'_y)/\Sigma_B |g'_y|$$

where $\alpha$ and $\beta$ are the movement amounts in the x and y directions, respectively, d is the concentration difference between two continuous images as a function of time at the same position, i.e., a time gradient, and $g'_x$ and $g'_y$ are the spatial gradients in the x and y directions when the image is given as g. Note that $\Sigma_B$ represents a total sum operation within a block, and sign() is a function of outputting signs of the gradients $g'_x$ and $g'_y$.

A movement vector is calculated by the following equation according to the representative point matching:

$$P(i,j) = \Sigma_B \Sigma_B |g_0(x-i, y-j) - g_1(x,y)|$$

where $g_0(x,y)$ and $g_1(x,y)$ are two continuous images as a function of time, and i and j are the movement amounts of the images, respectively.

More specifically, a cumulative value of the absolute values of the differences between the two images upon shifting of the image $g_0(x,y)$ by the amounts i and j is obtained within a block as a unit operation area. A movement amount (i,j) which minimizes the vector P(i,j) is defined as a movement vector of the corresponding block. The calculation of P(i,j) may be performed by using a square of a difference or a nonlinear function in place of use of the absolute value of the difference.

When the time and spatial gradient method or the representative point matching method is used, a low-pass filter, having characteristics which prevent detailed information in an image from being lost, is used as a preprocessing filter. The use of the low-pass filter aims at smoothing a sharp edge portion of the image or reducing input image noise. The size and shape of blocks obtained by dividing an input image are normally predetermined and are decided independently of the characteristics of the preprocessing filter.

In the conventional example described above, a detection range is narrowed by a high-frequency component of an input image, and it is difficult to apply this conventional technique to an image having a large movement amount. In order to solve this problem, a low-pass filter having a sufficiently large mask is used, and the image is divided into large blocks including spatial gradients in various directions, thereby widening the detection range. According to this technique, however, the use of large blocks undesirably causes a decrease in resolution.

According to the above method, the detection range is narrowed by the high-frequency component of the input image, and it is difficult to apply this method to an image having a large movement amount.

A relationship between the total sum $\Sigma_B$ within the block and the detection block will be taken into consideration. The size and shape of each block for the total sum $\Sigma_B$ are generally predetermined. When the size of the block is increased, the detection range is increased accordingly. When the block is large, a possibility for including edges in various directions within one block is increased, and clear signals can be obtained against noise, and vector synthesis can have higher precision. These advantages are described in the above literatures and Shingaku Giho IE78-67 "Measurement of movement amount or speed of a moving object by image signals".

When the block size is increased in the conventional example, the number of blocks constituting one frame is reduced, so that the number of vectors to be detected is reduced. Therefore, slight pattern movements cannot be easily detected.

SUMMARY OF THE INVENTION

The present invention has been made to solve the conventional problems described above, and has as its first object to provide a movement detection apparatus capable of accurately detecting an image movement with a high resolution from an image signal.

It is the second object of the present invention to provide a movement detection apparatus having a wide detection range at a high resolution.

It is the third object of the present invention to provide a movement vector detection apparatus which can variably set the position and size of a movement vector detection area within a frame to detect a movement vector at an optimal detection position.

It is the fourth object of the present invention to provide a movement vector detection apparatus capable of accurately obtaining a frame area for obtaining a final movement vector by deciding the image area by giving priority to a spatial resolution over a detection range, of giving priority to the detection range over the spatial resolution in a movement vector operation means when a frame vibration occurs since it provides vectors having predetermined magnitudes in a given direction, and of simultaneously establishing a wide detection range and a high spatial resolution since the detection range and the spatial resolution can be independently selected.

In order to achieve the above objects of the present invention, there is disclosed a movement vector detection apparatus comprising area deciding means for calculating a movement vector from a signal which passes through first filter means and detecting the movement vector, and movement vector operating means for calculating a movement vector associated with an image area in accordance with a signal which passes through second filter means and under the control of the area deciding means.

It is the fifth object of the present invention to provide a movement detection apparatus capable of setting an optimal detection range for detecting an image movement in accordance with a state of an image.

It is the sixth object of the present invention to provide a movement detection apparatus having a wide movement detection range so that the apparatus can be applied to an image having a large movement amount.

It is the seventh object of the present invention to provide a movement detection apparatus capable of selecting a specific frequency in accordance with an application or object to assure an optimal detection range for each application or object since the detection range can be selected in accordance with a condition of each image.

It is the eighth object of the present invention to provide a movement vector detection apparatus for allowing an operator to facilitate numerical manipulation since the movement vector detection range can be widened and the frequency component can be limited to the specific frequency.

In order to achieve the fifth to eighth objects of the present invention according to a preferred embodiment of the present invention, there is disclosed a movement vector detection apparatus comprising filter means for extracting a specific frequency component from an input image signal, and operating means for calculating a movement vector from an output from the filter means in accordance with a block size corresponding to the specific frequency component.

It is the ninth object of the present invention to provide a movement detection apparatus capable of adaptively changing the size and shape of a detection block for detecting a movement vector of an image within a frame, thereby accurately detecting a movement of the image.

It is the tenth object of the present invention to provide a movement vector detection apparatus capable of performing high-precision detection and obtaining a wide detection range for an object having a large movement amount or a fine pattern image upon detection of a movement within a detection area having a predetermined size and shape corresponding to features of an image.

In order to achieve the ninth and tenth objects of the present invention according to a preferred embodiment of the present invention, there is disclosed a movement vector detection apparatus for detecting a movement vector in units of blocks constituting an image, comprising feature extracting means for extracting a feature of the image, and block size calculating means for deciding a size and a shape of the block in accordance with the feature extracted by the feature extracting means.

It is the eleventh object of the present invention to provide a movement vector detection apparatus capable of accurately detecting a movement vector of an object having a large movement amount and capable of detecting information of a movement of a fine pattern object with a high spatial resolution since the size of the operation block of the movement vector is changed in accordance with a given image.

The above and other objects, features, and advantages of the present invention will be apparent from the following detailed description in conjunction with the accompanying drawings.

BRIEF DESCRIPTION OF THE DRAWINGS

FIG. 10 is a conversion table for converting a nonlinear output into a linear output;

DETAILED DESCRIPTION OF THE PREFERRED EMBODIMENTS

Preferred embodiments of the present invention will be described with reference to the accompanying drawings.

Figure 1:
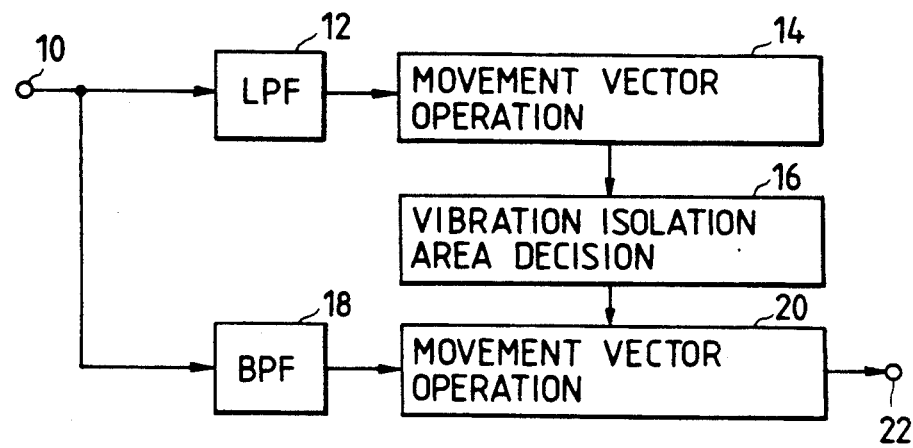
FIG. 1 is a block diagram showing an arrangement of the first embodiment according to the present invention.

FIG. 1 shows an embodiment in which the present invention is applied to a vibration isolation apparatus for preventing a frame vibration of an image signal in an image pickup apparatus such as a television camera, a video camera, or an electronic camera. This vibration isolation apparatus comprises an input terminal 10 for an image signal output from an image pickup element such as a CCD, a low-pass filter (LPF) 12, a movement vector operation circuit 14 (to be described in detail later) for obtaining a movement vector in accordance with a time and spatial gradient method or a representative point matching method, a vibration isolation area decision circuit 16 for deciding an area subjected to vibration isolation (to be referred to as a vibration isolation area hereinafter) of an input image when the present invention is applied to a vibration isolation apparatus for correcting an image vibration, a band-pass filter (BPF) 18, a movement vector operation circuit 20 for obtaining a time and spatial gradient method or representative point matching method, and an output terminal 22 for outputting a signal representing an image movement amount.

The image signal input to the input terminal 10 is supplied to a vibration isolation area decision circuit 30 and a frame vibration amount detection circuit for detecting a frame vibration amount caused by hand vibration. In order to decide a vibration isolation area, an image is divided into a large number of blocks within a frame to detect slight local movements. The LPF 12 must have frequency characteristics which prevent detailed information within the image from being lost. The movement vector operation circuit 14 calculates a movement vector of each block from an output from the LPF 12 in accordance with the time and spatial gradient method or representative point matching method. The size and shape of the block are fixed in the operation circuit 14. The vibration isolation area decision circuit 16 decides a vibration isolation area from an output from the operation circuit 14.

Figure 2A:
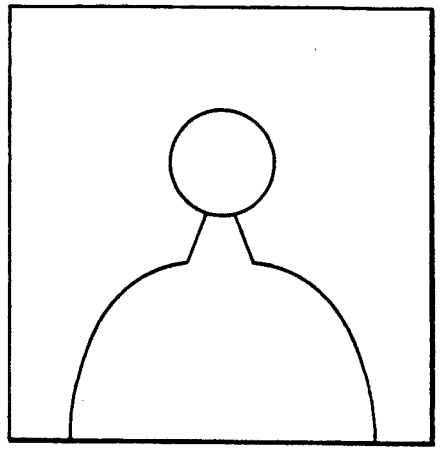
FIGS. 2A to 2C are views for explaining procedures for determining a vibration isolation area.
Figure 2B:
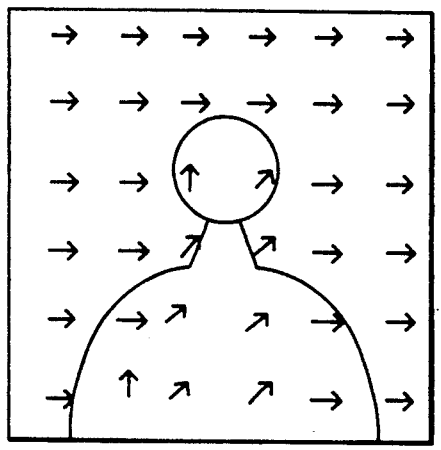
Figure 2C:
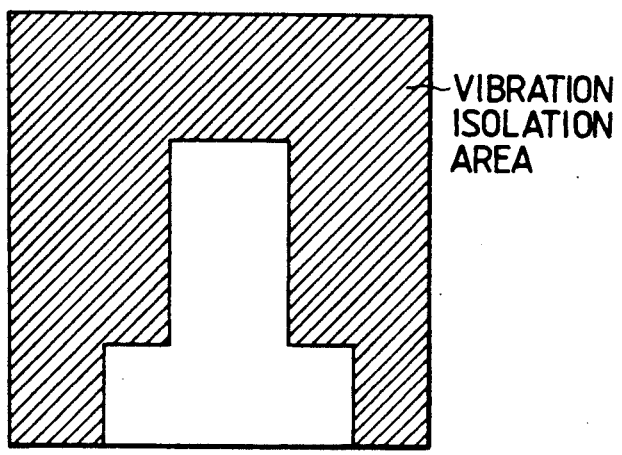

Procedures for deciding a vibration isolation area will be described with reference to FIGS. 2A to 2C. From an output image (FIG. 2A) output from the LPF 12, the movement vector operation circuit 14 outputs movement vectors of the respective blocks obtained by equally dividing an input image in the horizontal and vertical directions. The movement vectors are given as shown in FIG. 2B. The vibration isolation area decision circuit 16 performs statistical processing of these pieces of vector information, thereby deciding a vibration isolation area, as shown in FIG. 2C.

In order to detect a frame vibration caused by hand vibration, an input image signal is input from the input terminal 10 to the BPF 18. An operation of the BPF 18 will be described in detail with reference to FIGS. 4, 5, and 6. The movement vector operation circuit 20 calculates a frame vibration amount caused by hand vibration or the like by using an output from the BPF 18 in accordance with the time and spatial gradient method or representative point matching method and outputs the calculated frame vibration amount. The size and shape of the block of the movement vector calculation circuit 20 depend on a pattern period T of an output signal from the BPF 18. In accordance with the rime and spatial gradient method or representative point matching method, gradients in various directions must be included in the blocks. Therefore, a block having a sufficiently large size corresponding to the corresponding period T is selected. When such a large block is selected, the spatial resolution is greatly decreased. Since the movement vectors generated within the vibration isolation area are not caused by an object movement but by a movement caused by hand vibration, the movement vectors have predetermined magnitudes in one direction. Therefore, a decrease in spatial resolution does not present a problem.

Figure 3:
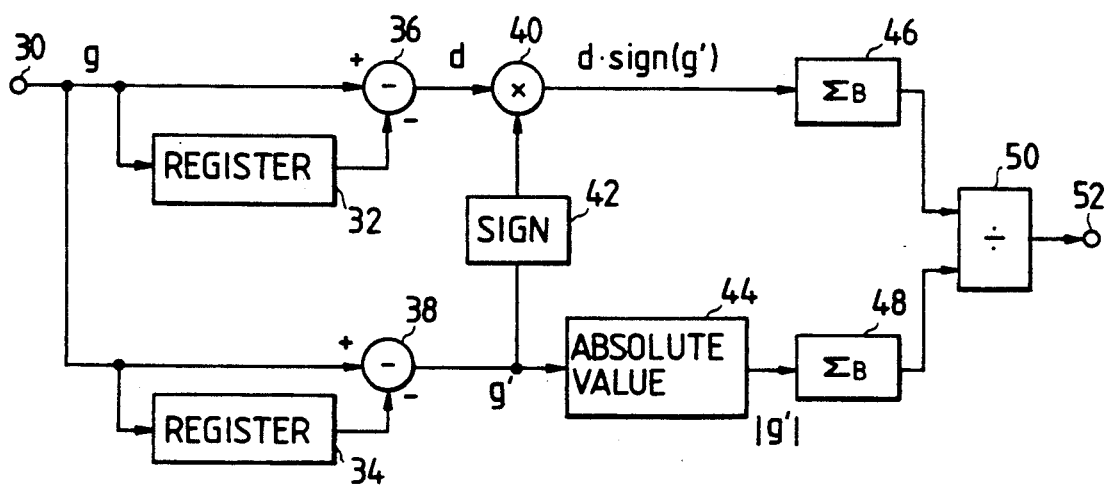
FIG. 3 is a block diagram showing a time and spatial gradient operation circuit.

FIG. 3 shows a circuit arrangement of the movement vector operation circuit according to the time and spatial gradient method. This vector operation circuit comprises an input terminal 30 for receiving an image signal corresponding to an output from the LPF 12 shown in FIG. 1, registers 32 and 34 for storing image signals at necessary times, subtracters 36 and 38, a multiplier 40, a sign output circuit (SIGN) 42 for outputting a signal representing a sign (positive, negative, or zero sign) of output data from the subtracter 38, an absolute value circuit 44 for outputting an absolute value of the output data from the subtracter 38, total sum circuits 46 and 48 for accumulating and adding the data within a designated block, a divider 50, and an output terminal 52 for outputting a signal representing a movement amount in a spatial gradient direction.

An operation of the circuit arrangement shown in FIG. 3 will be described below. An image signal g input to the input terminal 30 is divided into two components. A concentration difference, i.e., a time gradient d between two continuous images as a function of time is calculated by the register 32 and the subtracter 36. A spatial gradient g' within an image at an arbitrary time is calculated by the register 34 and the subtracter 38. When the spatial gradient g' is positive, the sign output circuit 42 outputs a +1 signal. When the gradient g' is zero, the sign output circuit 42 outputs 0. When the gradient g' is negative, the sign output circuit 42 outputs a −1 signal. The multiplier 40 multiplies the time gradient d (i.e., the output from the subtracter 36) with the output from the sign output circuit 42. The total sum circuit 46 calculates a total sum of outputs from the multiplier 40 in units of blocks. The absolute value circuit 44 calculates the absolute value of the spatial gradient g' (i.e., the output from the subtracter 38). The total sum circuit 48 calculates a total sum of the outputs from the absolute value circuit 44 in units of blocks.

The divider 50 divides the output from the total sum circuit 46 by the output from the total sum circuit 48. The quotient from the divider 50 represents a movement amount in each block in the spatial gradient direction. This movement amount is supplied from the output terminal 52 to, e.g., the vibration isolation area decision circuit 16 shown in FIG. 1.

Figure 4:
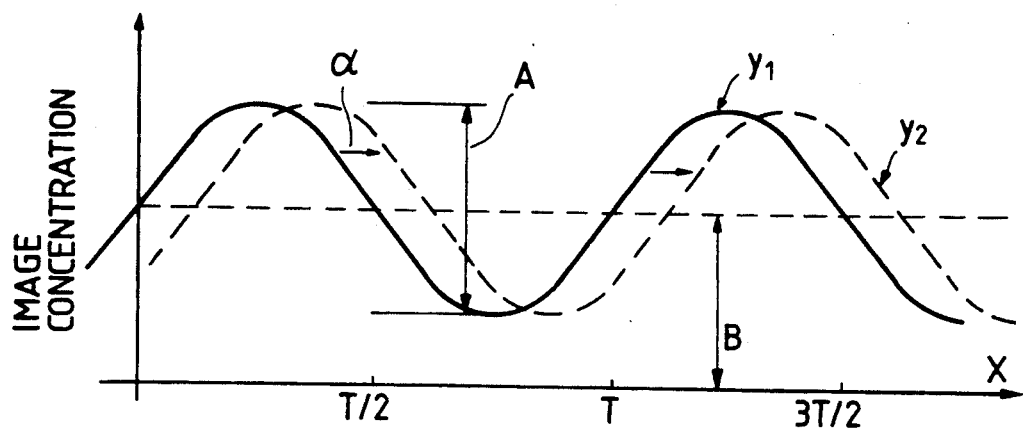
FIG. 4 is a sectional view showing an image pattern having a period T.

An operation of the BPF 18 will be described in detail with reference to FIGS. 4, 5, and 6. The input image can be decomposed into frequency components constituting the input image by Fourier transform. A waveform representing a concentration change on a given section of the input image is subjected to linear Fourier transform to extract only a component having a frequency 1/T. The extracted component is then subjected to inverse Fourier transform to obtain a sinusoidal wave having a period T, as shown in FIG. 4. The concentration value of the image is plotted along the ordinate y of FIG. 4, and a position on the section is plotted along the abscissa x. Reference symbol A denotes an amplitude of a sinusoidal wave; B, a sinusoidal wave bias voltage. When the time and spatial gradient method is applied to this pattern, the following result can be obtained. Note that, reference symbol $y_1$ represents an image prior to movement; and $y_2$, an image shifted by $\alpha$ in the x direction. A time gradient $d(x)$ and a spatial gradient $y_1'(x)$ are given as follows:

$$\begin{aligned} d(x) &= y_1 - y_2 \\ &= A\{\sin\omega x - \sin\omega(x - \alpha)\} \\ y_1'(x) &= \partial y_1/\partial x \\ &= A\omega\cos\omega x \\ \text{for } \omega &= 2\pi/T \end{aligned}$$

An estimated movement amount $e(\alpha)$ is given as follows:

$$e(\alpha) = \Sigma_B d(x) \cdot \text{sign}(y_1')/\Sigma_B |y_1'|$$

where $\Sigma_B$ is the total sum within the block as in the prior art described above. The movement amount $e(\Sigma)$ given when the block size is set to be equal to the period T of the pattern is defined as follows:

$$\begin{aligned} e(\alpha) &= (2\pi/T)\sin\omega\alpha \\ &= (2\pi/T)\sin(2\pi\alpha/T) \end{aligned}$$

Figure 5:
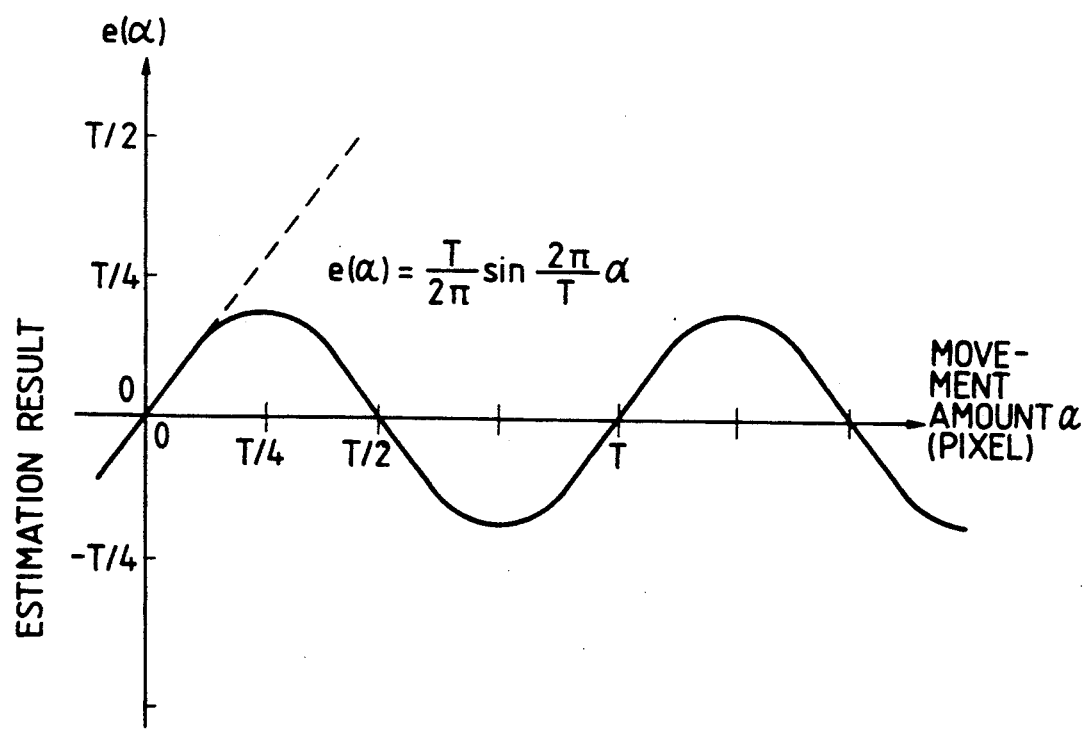
FIG. 5 is a graph showing an estimation result of a movement amount obtained when a time and spatial gradient method is applied to a pattern having a period T.

FIG. 5 shows a relationship between the movement amount $\alpha$ in units of pixels plotted along the abscissa and the estimation result in units of pixels along the ordinate. The following facts are derived from FIG. 5. First, the estimation result has the same period as that of the pattern period T of the image, and the movement amount accurately estimated from its shape is limited within the range of $\pm T/4$. Second, the estimation result does not depend on an amplitude A and a bias B of the image pattern, but can be given as a sinusoidal wave corresponding to the pattern period T of the image.

The matching method can be applied to the pattern T having the period T shown in FIG. 4. A total sum $P(\alpha)$ of the absolute values of the differences within a block is given as follows:

$$\begin{aligned} P(\alpha) &= \Sigma_B |y_1 - y_2| \\ &= \Sigma_B |A\sin\omega x - A\sin\omega(x \cdot \alpha)| \end{aligned}$$

The total sum $P(\alpha)$ obtained when the block size is set to be equal to the period T is given as follows:

$$P(\alpha) = \omega(4AT/\pi) \sin(\pi/T)\alpha$$

Figure 8:
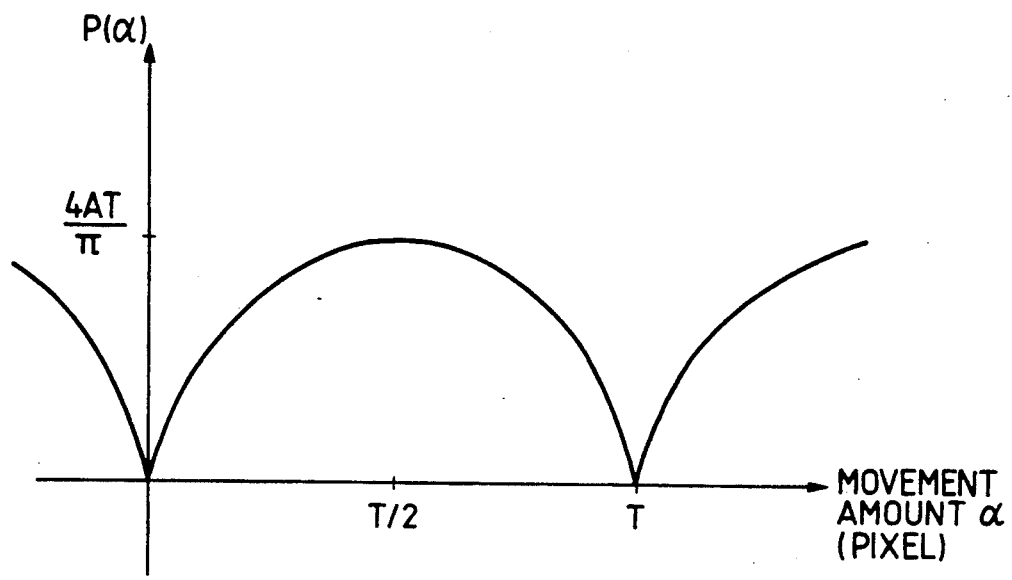
FIG. 8 is a graph showing an absolute value sum of the differences between two images when a matching method is applied to a pattern having a period T.

The calculation is repeated at the period T. The movement amount $\alpha$ in units of pixels is plotted along the abscissa of FIG. 8, and the total sum $P(\alpha)$ of the absolute values of the difference within the block is plotted along the ordinate.

If condition $-T/2 > \alpha > T/2$ is given, the movement amount $\alpha$ can be converged to $\alpha$ which minimizes the total sum $P(\alpha)$. When the movement amount $\alpha$ falls outside this range, mismatching occurs at a position shifted by nT (n=±1, ±2, ...) pixels. That is, the range (i.e., the detection range) for accurately estimating the movement amount is limited to $\pm \frac{1}{2}$, as can be seen from FIG. 8.

It is thus apparent that the detection range is determined by the pattern range T extracted by the BPF 18. A wide detection range obtained upon application of the time and spatial gradient method to the pattern having the period T is shown in FIG. 6. The variables plotted along the ordinate and abscissa of FIG. 6 are the same as those in FIG. 5. A sinusoidal wave represented by a solid curve in FIG. 6 is an estimation result of a pattern having a period T=80 pixels. A sinusoidal wave represented by a dotted curve represents an estimation result of a pattern having a period T=40 pixels. A line extending from the origin and tangential to the sinusoidal waves represents an ideal output result. From these estimation results, the movement detection range can be freely selected by the period T of the image pattern.

In this embodiment, as shown in FIG. 1, in addition to a preprocessing filter for deciding the vibration isolation area, i.e., the LPF 12, another preprocessing filter for calculating a final vector, i.e., the BPF 18 is arranged to simultaneously establish both the wide detection range and clear, high-speed, and high-resolution characteristics capable of calculating movement vectors by only numerical calculations. In this embodiment, the detection range is widened by the BPF 18. However, a low-pass filter for cutting a pattern having a short period may be used in place of the BPF 18 to obtain the same effect as described above.

Figure 7:
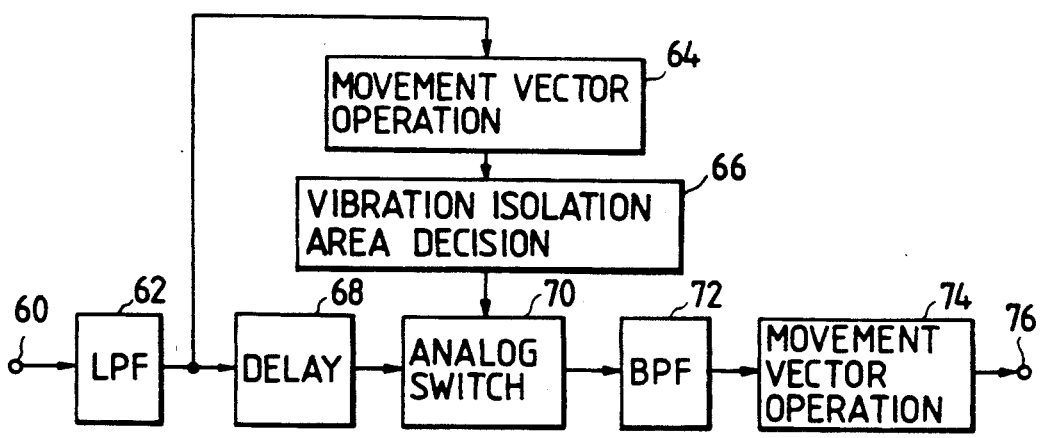
FIG. 7 is a block diagram showing an arrangement of the second embodiment of the present invention.

In the embodiment shown in FIG. 1, the two preprocessing filters 12 and 18 are connected in parallel with each other. These filters may be connected in series with each other. This arrangement is shown in the block diagram as the second embodiment in FIG. 7. The arrangement comprises an input terminal 60 for an image signal, an LPF 62, a movement vector operation circuit 64 based on the time and spatial gradient method or representative point matching method, a vibration isolation area decision circuit 66, a delay circuit 68 for adjusting an operation time of the movement vector operation circuit 64 and an operation time of the vibration isolation area decision circuit 66, an analog switch 70 which is turned on/off in response to an output from the vibration isolation area decision circuit 66, a BPF 72, a movement vector operation circuit 74 based on the time and spatial gradient method or representative point matching method, and an output terminal 76 for outputting a signal representing a final movement vector amount.

A portion consisting of the LPF 62, the movement vector operation circuit 64, and the vibration isolation area decision circuit 66 has the same function as a portion consisting of the LPF 12, the movement vector operation circuit 14, and the vibration isolation area decision circuit 16 shown in FIG. 1. More specifically, the movement vector operation circuit 64 calculates a distribution of movement vectors for a block having a predetermined size. The vibration isolation area decision circuit 66 detects vibration isolation areas in which the magnitudes and directions of movement vectors are equal to each other, and the analog switch 70 is turned on within this vibration isolation area. Therefore, an image signal within the vibration isolation area is input to the BPF 72.

Filter processing for widening the detection range is performed by the BPF 72, and movement vectors in the block having the size and shape corresponding to the filtering range of the BPF 72 are calculated by the movement vector operation circuit 74 in accordance with the time and spatial gradient method or representative point matching method. A low-pass filter may be used in place of the BPF 72.

The effective time and spatial gradient method and matching method of calculating movement vectors have been described above. However, methods of calculating movement vectors using image processing are exemplified by a Fourier transform method which defines the time and spatial gradient method by a frequency space, and a transcorrelation method of calculating the movement vectors on the basis of a transcorrelation of two image signals. These techniques strongly depend on the spatial frequency of the input image signal. Therefore, the same effect as in the time and spatial gradient method and matching method can be obtained in the circuit arrangement shown in FIG. 1 or 7.

As described above, a target image movement amount signal appears at the output terminal 76.

As can be understood from the above description, according to the present invention, both the wide movement vector detection range and the high spatial resolution can be assured.

The third embodiment of the present invention will be described with reference to FIGS. 9 and 10. A circuit arrangement of this embodiment is incorporated in the circuit arrangement of the first embodiment. In the third embodiment, especially, a detection range can be adaptively assured in accordance with a state of an object, and specifically a frame.

Figure 9:
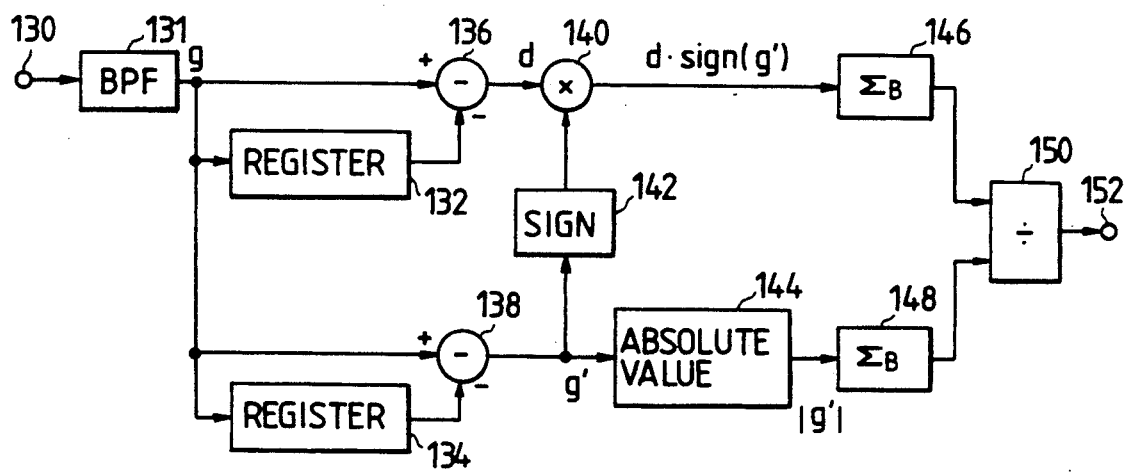
FIG. 9 is a block diagram showing an arrangement of the third embodiment of the present invention.

FIG. 9 is a block diagram showing a circuit arrangement of the third embodiment of the present invention. This arrangement comprises an input terminal 130 for an image signal, a band-pass filter (BPF) 131 whose frequency characteristics can be freely controlled, registers 132 and 134 for storing image signals at necessary times, subtracters 136 and 138, a multiplier 140, a sign output circuit (SIGN) 142 for outputting a signal representing a sign (positive, negative or zero value) of output data from the subtracter 138, an absolute value circuit 144 for outputting the absolute value of the output data from the subtracter 138, total sum circuits 146 and 148 for accumulating and adding data within a designated block, a divider 150, and an output terminal 152 for outputting a signal representing a movement amount in the spatial gradient direction.

An operation of the arrangement shown in FIG. 9 will be described below. An image signal input to the input terminal 130 is input to the BPF 131, and the BPF 131 extracts a specific frequency component. An output g from the BPF 131 is divided into two components. One component is input to the register 132 and the subtracter 36, so that a concentration difference, i.e., a time gradient d, between two images continuous as a function of time is calculated. The other component is input to the register 134 and the subtracter 138, so that a spatial gradient g' within an image at an arbitrary time is calculated. When the spatial gradient g' represents a positive value, the sign output circuit 142 outputs a +1 signal. When the spatial gradient g' represents zero, the sign output circuit 142 outputs 0. When the spatial gradient g' represents a negative value, the sign output circuit 142 outputs a −1 signal. The multiplier 140 multiplies the time gradient d (i.e., the output from the subtracter 136) with the output from the sign output circuit 142. The total sum circuit 146 calculates a total sum of outputs from the multiplier 140 in units of blocks. The absolute value circuit 144 calculates the absolute value of the spatial gradient g' (i.e., the output from the subtracter 138). The total sum circuit 148 calculates a total sum of outputs from the absolute value circuit 144 in units of blocks.

The divider 150 divides the output from the total sum circuit 146 by the output from the total sum circuit 148. The quotient from the divider 150 represents a movement amount in each block in the spatial gradient direction.

An operation of the BPF 131 is the same as that described in detail with reference to FIGS. 4, 5, and 6, and a detailed description thereof will be omitted in order to prevent the descriptive repetition.

A detection range is determined by a pattern period T extracted by the BPF 131. A wide detection range obtained when the time and spatial gradient method is applied to the pattern of the period T is shown in FIG. 6. The variables plotted along the ordinate and abscissa of FIG. 6 are the same as those in FIG. 5. A sinusoidal wave represented by the solid curve in FIG. 6 represents an estimation result of a pattern having a period T=80 pixels. A sinusoidal wave represented by a dotted curve represents an estimation result of a pattern having a period T=40 pixels. A line extending from the origin and tangential to the sinusoidal waves represents an ideal output result. Judging from both the estimation results, the movement detection range can be freely selected in accordance with the period T of the image pattern.

In this embodiment, by properly selecting frequency characteristics of the BPF 131, the detection range of the movement vectors is caused to correspond to an intended application. For example, a detection range for hand vibration isolation of a video camera can be calculated as follows. That is, when a maximum hand vibration amount between images continuous as a function of time is given as A (pixels), and a correction ratio obtained by the vibration isolation function is given as B (e.g., ⅓ or 1/5), a necessary detection range is given as A×B (pixels). On the other hand, when a period of an image pattern is given as T (pixels), i.e., a frequency 1/T, since a detection range is ±T/4 upon application of the time and spatial gradient method as a method of detecting movement vectors, a necessary condition for the detection period T for frame vibration caused by hand vibration is given as follows:

$$-T/4 < A \times B < T/4$$

Similarly, since the detection range obtained when the matching method is applied as a method of detecting movement vectors is given as ±T/2 as described above, a necessary condition for the detection period T for frame vibration caused by hand vibration is given as follows:

$$-T/2 < A \times B < T/2$$

When a filter for extracting a pattern having the period T which satisfies the above condition is employed as the BPF 131, a sufficiently wide detection range can be assured.

In this case, the method of calculating movement vectors is not limited to the time and spatial gradient method or the matching method, but can be replaced with a Fourier transform method which defines the time and spatial gradient method by a frequency space, or a transcorrelation method for calculating movement vectors on the basis of the transcorrelation of two image signals. Since such a technique strongly depends on the spatial frequency of the input image signal, the same effect as in the time and spatial gradient method or matching method can be obtained.

The size and shape of the block in the total sum circuits 146 and 148 are determined by filtration characteristics of the BPF 131 which are determined as described above. Since gradients in various directions must be included within the block according to the time and spatial gradient method, a sufficiently large block is employed in accordance with the pattern period T of the output image signal from the BPF 131.

Figure 6:
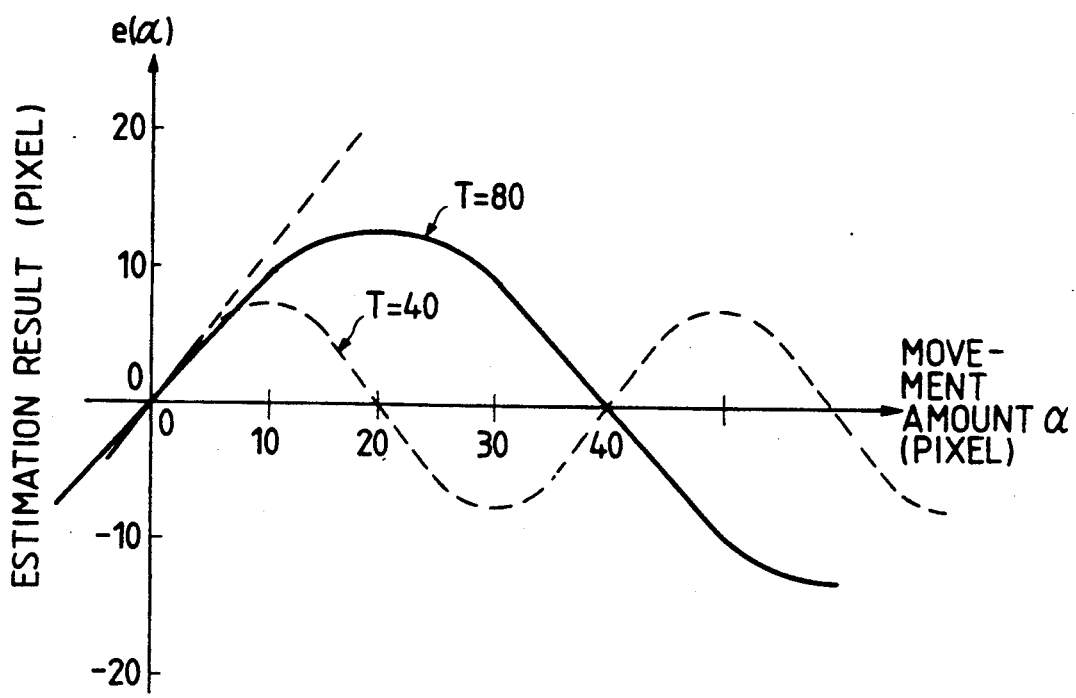
FIG. 6 is a graph showing estimation results obtained by comparison using the period T.

In the above description, although the image movement amount to be estimated in correspondence with the period T of the image pattern is given as $\pm T/4$, a region in which an estimation result is linearly obtained with respect to an actual image movement amount is apparently narrower than the above range, as can be seen from FIGS. 5 and 6. If a linear region is defined by $\pm T8$, a necessary condition for the period T in movement vector detection is given as:

$$-T/8 < A \times B < T/8$$

where A is the maximum hand vibration amount between the continuous images, and B is the correction ratio obtained when the vibration isolation function is executed.

Since the estimation result is, however, represented by a sinusoidal wave inherently depending on only the pattern period T, the estimation result is converted so that the estimation result becomes linear with respect to the actual image movement within the range of $\pm T/4$. This can be realized by adding a converter (e.g., a ROM) between the divider 150 and the output terminal 152 in FIG. 9. A conversion table of this converter is exemplified in FIG. 10. Conversion results with respect to calculation results in units of extracted frequencies, i.e., in units of periods of the extracted sinusoidal waves are vertically arranged in FIG. 10. For example, when the calculation result for the sinusoidal wave having the period T=40 is given as $T/2\pi$, this is converted to obtain a value of 10.

In the above description, a change in brightness between images continuous as a function of time is neglected. However, a countermeasure provided when this assumption is not established will be described below. After the pattern of the period T is extracted by the BPF 131, an image $y_1$ obtained before a movement is represented as follows:

$$y_1 = A \sin \omega x + B$$

An image $y_2$ is obtained as follows when the image $y_1$ is moved by $\alpha$ in the x direction and all values are multiplied with k due to a change in illumination:

$$y_2 = \{A \sin \omega(x - \alpha) + B\} \times k$$

$$\text{for } \omega = 2\pi/T$$

In this case, when the block size is set to be equal to the extracted image period T, and the time and spatial gradient method is executed, an estimation result is given by:

$$\alpha = (kT/2\pi) \sin (2\pi\alpha/T)$$

This value is equal to a value which is k times the estimation result obtained when the change in illumination is absent. Therefore, a change k in illumination between the images continuous as a function of time is detected by a certain method, and the estimation results are uniformly multiplied with 1/k, thereby compensating for the influences of changes in illumination.

As can be readily understood from the above description, according to the present invention, the movement vector detection range can be widened. In addition, since only a specific frequency component is processed as an objective target, numerical calculations can be facilitated.

The fourth embodiment of the present invention will be described with reference to FIGS. 11 to 15.

This embodiment solves a problem posed by an increase in detection block size of movement vectors. That is, when the detection block size is increased, the number of blocks constituting the entire image is reduced, and the number of detectable vectors is reduced. Therefore, slight movements of a fine pattern can hardly be detected. The characteristic feature of this embodiment lies in an apparatus in which an image is divided into a plurality of blocks and movement vectors are detected in units of blocks, comprising a feature extracting means for extracting features of an image, and a block size calculating means for deciding a size and a shape of the block in accordance with the features extracted by the feature extracting means. Movement vectors can be detected in accordance with the size and shape corresponding to the features of the image. The movement vectors can be detected with high precision in accordance with a state of an object. At the same time, a wide detection range can be obtained even for an image having a fine pattern.

This embodiment will be described with reference to the accompanying drawings.

Figure 11:
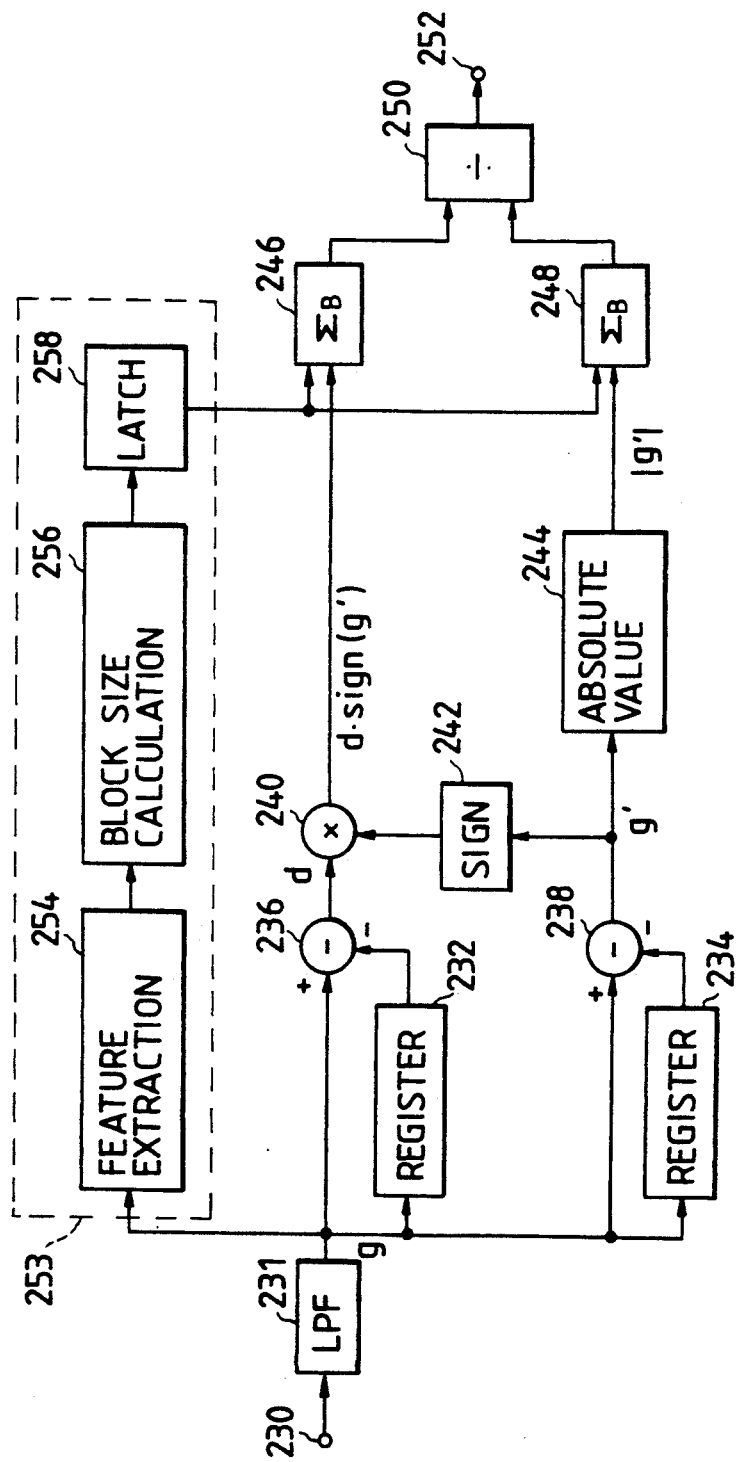
FIG. 11 is a block diagram showing an arrangement of the fourth embodiment of the present invention.

FIG. 11 is a block diagram showing an arrangement of this embodiment. The arrangement comprises an input terminal 230 for an image signal (e.g., a luminance signal of a color signal), a low-pass filter (LPF) 231, registers 232 and 234 for storing image signals at necessary times, subtracters 236 and 238, a multiplier 240, a sign output circuit (SIGN) 242 for outputting a signal representing a sign (positive, negative or zero value) of the output data from the subtracter 238, an absolute value circuit 244 for outputting the absolute value of the output data from the subtracter 238, total sum circuits 246 and 248 for accumulating and adding the data within a designated block, a divider 250, and an output terminal 252 for outputting a signal representing a movement amount in the spatial gradient direction.

The circuit arrangement of this embodiment further includes a circuit 253 for extracting features of an input image signal to decide the size and shape of the block in the total sum circuits 246 and 248. The circuit 253 comprises a feature extraction circuit 254 for extracting features from an output signal from the LPF 231, a block size calculation circuit 256 for calculating the optimal size and shape, i.e., a block size, of a block in accordance with an output from the feature extraction circuit 254, and a latch circuit 258 for latching an output from the block size calculation circuit 256 and applying an output to control inputs of the total sum circuits 246 and 248.

In order to detect movement vectors in the horizontal and vertical directions, two sets of the circuits 231 to 258 are required.

An operation of the arrangement shown in FIG. 11 will be described below. An image signal input to the input terminal 230 is input to the LPF 231, so that a specific frequency component is extracted. The feature extraction circuit 254 extracts features of the input image signal from an output from the LPF 231. The block size calculation circuit 256 calculates the block size (i.e., the size and shape) corresponding to the features extracted by the feature extraction circuit 254. The latch circuit 258 latches an output from the block size calculation circuit 256 to adjust circuit processing times and synchronization of the circuits 232 to 244, and outputs a signal to the total sum circuits 246 and 248.

In order to calculate time and spatial gradients, an output g from the LPF 231 is divided into two components. One component is input to the register 232 and the subtracter 236, so that a concentration difference, i.e., a time gradient d between two images continuous as a function of time is calculated. The other component is input to the register 234 and the subtracter 238, so that a spatial gradient g' within an image at an arbitrary time is calculated. When the spatial gradient g' represents a positive value, the sign output circuit 242 outputs a +1 signal. When the spatial gradient g' represents zero, the sign output circuit 242 outputs 0. When the spatial gradient g' represents a negative value, the sign output circuit 242 outputs a −1 signal. The multiplier 240 multiplies the time gradient d (i.e., the output from the subtracter 236) with the output from the sign output circuit 242. The total sum circuit 246 calculates a total sum of outputs from the multiplier 240 in units of blocks in accordance with the block size represented by a block size signal from the latch circuit 258. The absolute value circuit 244 calculates the absolute value of the spatial gradient g' (i.e., the output from the subtracter 238). The total sum circuit 248 calculates a total sum of outputs from the absolute value circuit 244 in units of blocks in accordance with the block size represented by the block size signal from the latch circuit 258.

The divider 250 divides the output from the total sum circuit 246 by the output from the total sum circuit 248. The quotient from the divider 250 represents a movement amount of each block having the size corresponding to the features of the input image signal in the spatial gradient direction.

Figure 12:
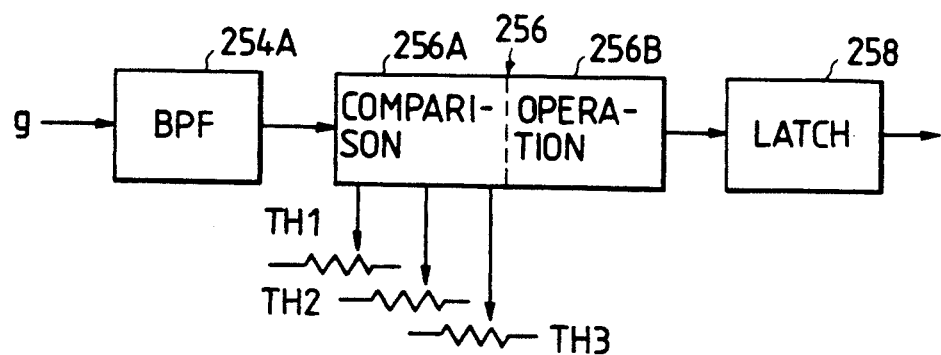
FIGS. 12, 13, and 14 are block diagrams showing arrangements of the fourth embodiment of the present invention.
Figure 13:
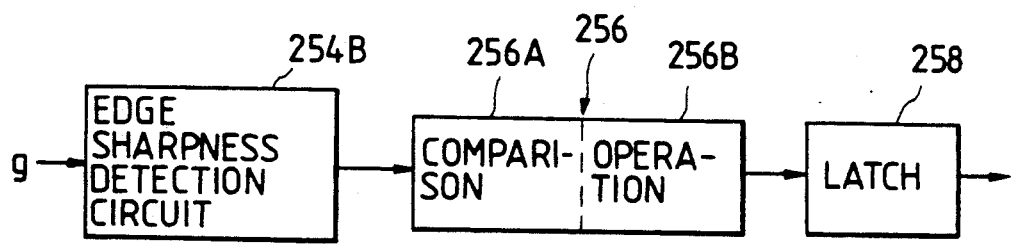
Figure 14:
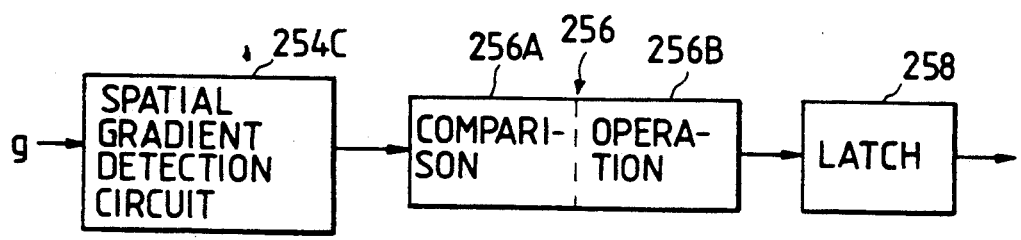

Detailed arrangements of the circuit 253 are shown in FIGS. 12, 13, and 14, respectively. FIG. 12 shows a circuit arrangement obtained when a BPF 254A is used as the feature extraction circuit 254. The center frequency of the BPF 254A is set to be about 1 to 4 MHz for a conventional television signal (e.g., an NTSC signal). When the amount of frequency components falling within the above range is small in an image signal g output from the LPF 231, the image has a low contrast level and contains a small number of sharp edges. The block size calculation circuit 256 comprises a comparator 256A and an operation circuit 256B for actually calculating a block size in accordance with a comparison result from the comparator 256A. The comparator 256A compares the frequency component from the BPF 254A with threshold values TH1, TH2, . . . . The operation circuit 256B calculates an optimal block size in accordance with the comparison results from the comparator 256A. The operation circuit 256B comprises a conventional digital operation circuit or a ROM table which prestores data. The number of comparison threshold values in the comparator 256A may be one, or may be a plurality of threshold values TH1, TH2, . . . shown in FIG. 12. The latch circuit 258 latches the output from the block size calculation circuit 256 and outputs a signal in synchronism with a television sync signal.

Figure 15A:
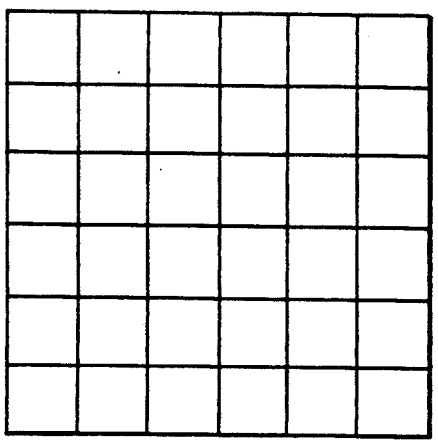
FIGS. 15A to 15F are views showing frame divisions.
Figure 15B:
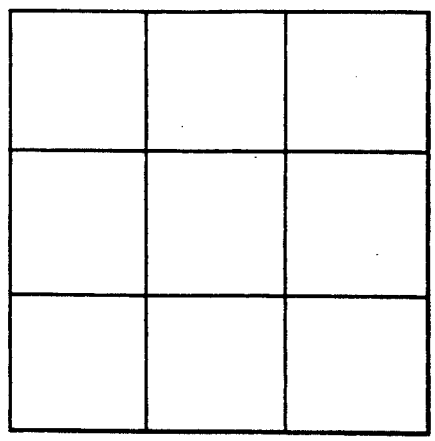

FIGS. 15A to 15F show frame divisions obtained by the block sizes determined as described above. In order to easily obtain an effect of this embodiment, the frame divisions shown in FIGS. 15A and 15B are selectively used. When an input image has a large number of edges, the frame division in FIG. 15A is used. However, when an input image has a small number of edges and a large number of blurring components, the frame division in FIG. 15B is used. In this manner, the frame division can be used in accordance with the features of the input image signals.

Figure 15C:
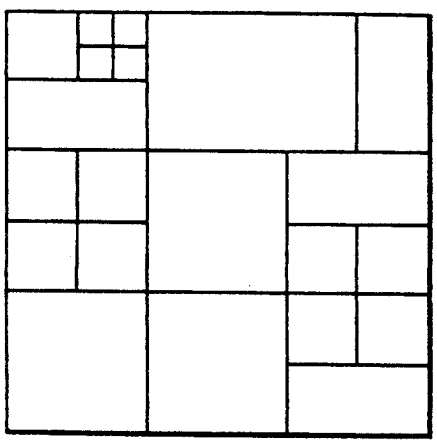

In addition, since an input image generally has a portion having a large number of edges and a portion having a small number of edges, a frame division having different block sizes and shapes shown in FIG. 15C may be preferably selected.

Figure 15D:
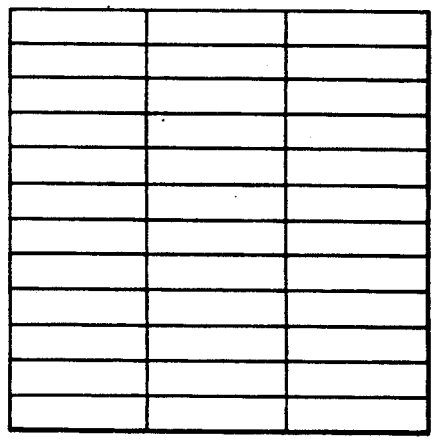

When the number of edges is small in one direction, e.g., when a camera is panned in the horizontal direction, a block size shown in FIG. 15D is preferably selected.

Figure 15E:
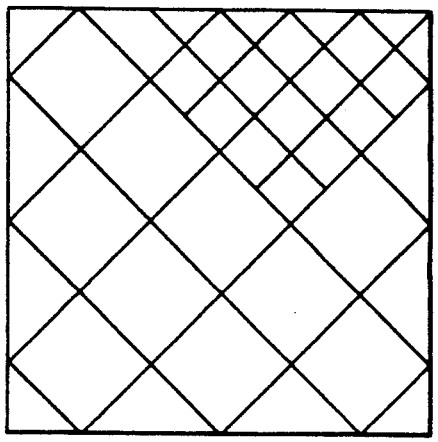
Figure 15F:
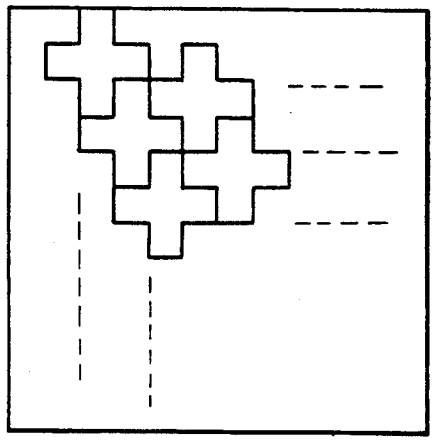

An image having a scene as a major image component has a small number of inclined components within the frame. In this case, frame divisions shown in FIGS. 15E and 15F can be effectively used. In FIGS. 15E and 15F, distances in the horizontal and vertical directions are larger than that in the oblique direction, which indicates that horizontal and vertical edges are possibly included. When a block size is determined so that each block has an equal number of edges, the block size in each of FIGS. 15E and 15F can be smaller than that in each of FIGS. 15A to 15D.

FIG. 13 shows an arrangement obtained when an edge sharpness detection circuit 254B is used as the feature extraction circuit 254. A block size calculation circuit 256 and a latch circuit 258 are the same as those in FIG. 12. A detailed arrangement of the circuit 254B is described in Japanese Laid-Open Patent Application No. 62-103616. An output value of the BPF 254A greatly depends on image brightness and contrast values. However, the circuit 254B performs evaluation using an edge sharpness (i.e., a reciprocal value of a blurring width) and is not adversely affected by the brightness value, the contrast value, and the size of the object. If an evaluation value of the circuit 254B is large, i.e., a sharp edge is present, a small block shown in FIG. 15A is selected. However, when the evaluation value is small, i.e., when no edge is present or an image greatly blurs, a large block as shown in FIG. 15B is selected.

FIG. 14 shows a circuit arrangement obtained when a spatial gradient detection circuit 254C is used as the feature extraction circuit 254. A block size calculation circuit 256 and a latch circuit 258 are the same as those in FIG. 12. Although this arrangement is adversely affected by the brightness value of the image as in the BPF 254A, the register 234 and some parts can be shared, so that the overall circuit arrangement can be made compact.

As can be readily understood from the above description, according to the present invention, the operation block size of movement vectors can be changed in accordance with attributes of the image, and the movement vectors can be detected with high precision in an object having a large movement amount. In addition, the movement information of an object having a fine pattern can be detected with a high spatial resolution.

Figure 17:
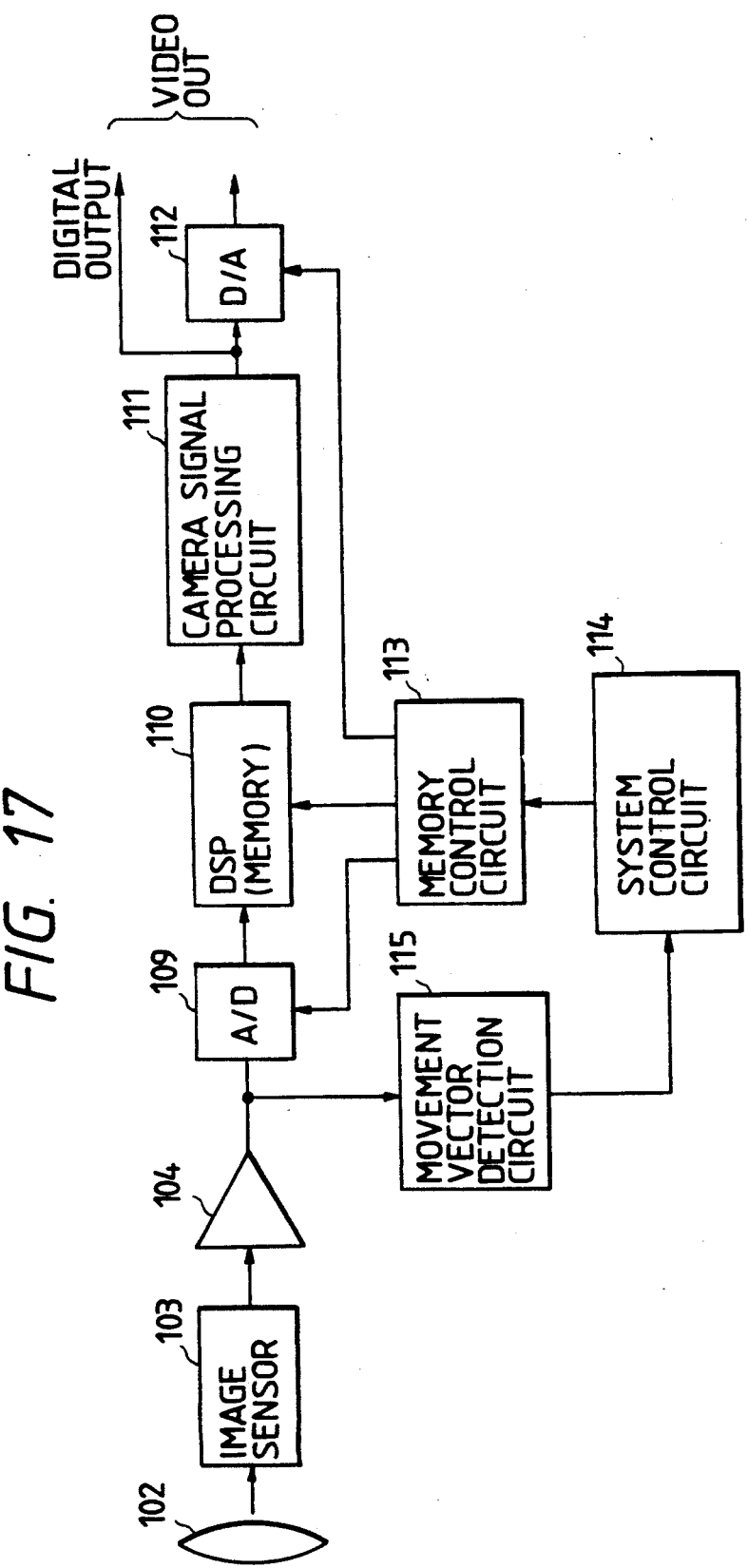
FIGS. 16 and 17 are block diagrams obtained when movement detection circuits of the present invention are applied as video camera vibration correction apparatuses, respectively.
Figure 16:
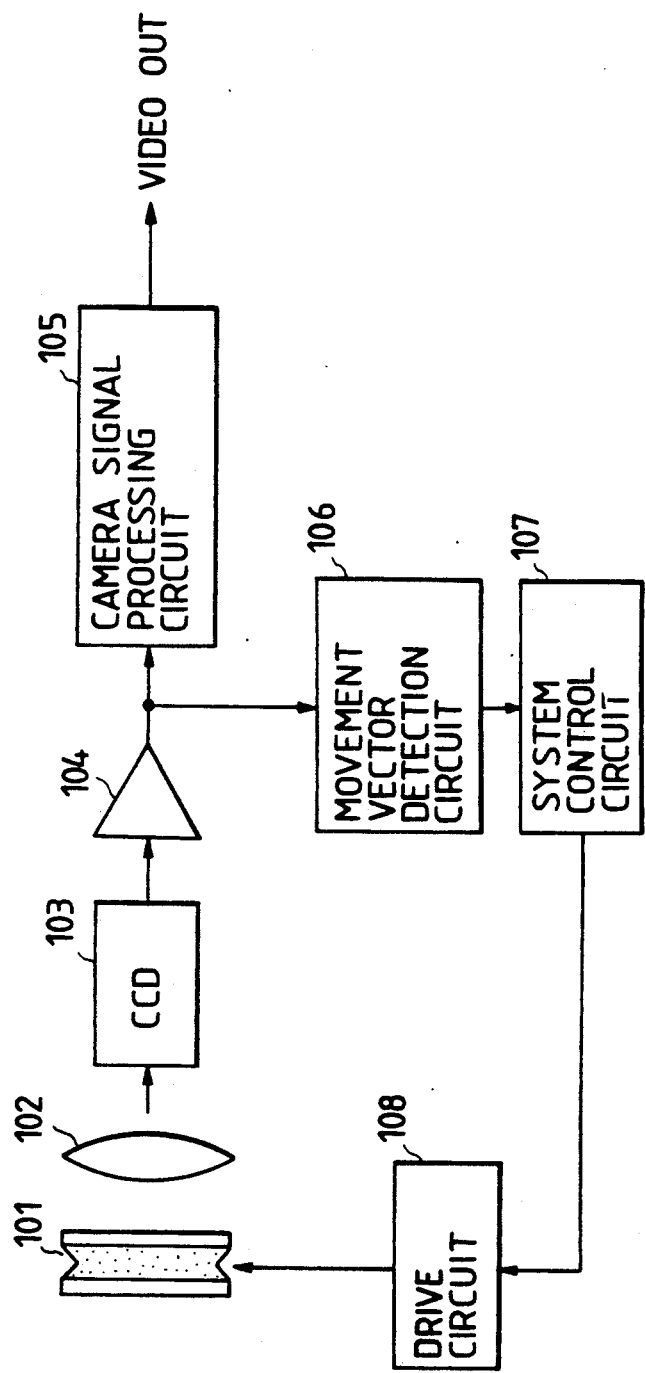

FIGS. 16 and 17 show embodiments in which movement vector detection circuits described above are applied as video camera vibration correction apparatuses (vibration isolation apparatuses).

FIG. 16 is a block diagram in which an optical axis of a photographic lens is set variable, and a variable vertex angle prism for optically correcting a variation is used as a vibration correcting means. Referring to FIG. 16, the video camera vibration correction apparatus includes a variable vertex angle prism 101 for variably adjusting a vertex angle, i.e., a direction of an optical axis of a photographic lens optical system. The prism 101 is obtained by filling a silicone liquid between two parallel glass plates. The apparatus also includes a photographic lens 102, an image pickup device 103 such as a CCD for photoelectrically converting an object image focused by the photographic lens 102 into an image pickup signal, a preamplifier 104, a camera signal processing circuit 105 for performing various operations such as blanking processing, sync signal addition, and gamma correction of the image pickup signal output from the image pickup device 103 and for outputting a normalized video signal, a movement vector detection circuit 106 having the same arrangement as in each of the embodiments described above, a system control circuit 107 for receiving image movement vector information supplied from the movement vector detection circuit 106 and for operating drive direction information for the variable vertex angle prism 101 to cancel an image movement caused by camera vibration, and a drive amount required for vibration correction, and a drive circuit 108 for driving the variable vertex angle prism 101 on the basis of the information calculated by the system control circuit 107.

A movement vector based on the image vibration (camera vibration) is detected by the movement vector detection circuit 106 described in each of the embodiments, and the drive direction and amount of the variable vertex angle prism 101 are calculated on the basis of this movement vector. The variable vertex angle prism 101 is driven to perform vibration correction.

The operation of the movement vector detection circuit itself has been described in each of the embodiments described above, and a detailed description thereof will be omitted here.

FIG. 17 shows an arrangement in which an image is temporarily stored in a memory and a read range of the memory is set variable to correct image movements without using any optical system as the vibration correction means.

The same constituting parts as in FIG. 16 are represented by the same reference numerals in FIG. 17, and a detailed description thereof will be omitted.

An image pickup signal output from a preamplifier 104 is converted into a digital signal by an A/D converter 109, and the digital signal is stored in a memory in a digital signal processing circuit 110. The A/D conversion rate and timing for storing the image in the memory and the write timing and address of the memory are controlled by a memory control circuit 113. The memory read address and timing are controlled by the memory control circuit 113.

A digital image signal read out from the memory 110 is subjected to various camera signal processing operations in a camera signal processing circuit 111 and is converted into an analog signal by a D/A converter 112. The analog signal is output as a video signal. The digital signal may be directly output as a digital video signal.

A movement vector detection circuit 115 detects a movement vector caused by camera vibration, as described in each of the above embodiments. The movement vector is supplied to a system control circuit 114. The system control circuit 114 calculates movement direction and amount of the image on the basis of the movement vector detected by the movement vector detection circuit 115. The memory control circuit 113 is controlled on the basis of the calculated movement direction and amount of the image, thereby controlling a read range of the memory. That is, an image is stored in the memory at an image angle larger than that of the image read out from the memory. In a read mode, the read range is variably controlled to correct the image movement. By shifting the read range in the movement direction, the image movement can be corrected.

In the above arrangement, the camera signal processing circuit may be connected to the output of the D/A converter 112 to perform analog signal processing. However, processing can be facilitated if digital signal processing in place of analog signal processing is performed. In addition, noise can be reduced.

Vibration correction in the video camera can be performed by the movement vector detection circuit according to the present invention. In addition, movement detection is not limited to vibration correction, but can be used in a variety of applications such as camera panning detection.

What is claimed is:

1. A movement detection apparatus comprising:
   A) first filter means;
   B) area deciding means for calculating a movement vector from a signal filtered through said first filter means and deciding an image detection area for detecting the movement vector on the basis of the calculated movement vector;
   C) second filter means for extracting a predetermined signal component from an image signal extracted on the basis of the image detection area controlled by said area deciding means; and
   D) movement vector operating means for calculating a movement vector associated with the image detection area from a signal filtered through said second filter means.

2. An apparatus according to claim 1, wherein said first filter means is a low-pass filter.

3. An apparatus according to claim 2, wherein a passband of said first filter means is determined on the basis of detection precision of a frame movement.

4. An apparatus according to claim 1, wherein said second filter means is a band-pass filter.

5. An apparatus according to claim 4, wherein a passband of said band-pass filter is determined in correspondence with a frequency component of frame vibration caused by hand vibration.

6. An apparatus according to claim 5, wherein said band-pass filter determines an image movement detection range in accordance with a period of an image pattern to be extracted by said band-pass filter.

7. An apparatus according to claim 1, wherein said area deciding means detects a distribution of frame vibrations from movement vectors at a plurality of positions on the frame and decides a detection area corresponding to a target image in accordance with statistical processing.

8. An apparatus according to claim 7, wherein said movement vector operating means quantitatively detects the frame vibration in accordance with a time and spatial gradient method.

9. An apparatus according to claim 7, wherein said movement vector operating means quantitatively detects the frame vibration in accordance with a representative point matching method.

10. A movement detection apparatus comprising:
A) area deciding means for detecting image movements at a plurality of positions on a frame and deciding an image detection area corresponding to a target image;
B) filter means for filtering an image signal corresponding to the image detection area decided by said area deciding means to control an image movement detection range;
C) movement vector operating means for operating a movement vector of an image within the image detection area from a signal filtered through said filter means on the basis of the image movement detection range corresponding to a filtered signal output by said filter means; and
D) correcting means for detecting an image vibration on the basis of the movement vector operated by said movement vector operating means and for correcting the image vibration.

11. An apparatus according to claim 10, wherein said filter means is a band-pass filter.

12. An apparatus according to claim 11, wherein a passband of said band-pass filter is determined in correspondence with a frequency component of frame vibration caused by hand vibration.

13. An apparatus according to claim 12, wherein said band-pass filter determines an image movement detection range in accordance with a period of an image pattern to be extracted by said band-pass filter.

14. An apparatus according to claim 10, wherein said area deciding means detects a distribution of frame vibrations from movement vectors at a plurality of positions on the frame and decides a detection area corresponding to a target image in accordance with statistical processing.

15. An apparatus according to claim 10, wherein said movement vector operating means quantitatively detects the frame vibration in accordance with a time and spatial gradient method.

16. An apparatus according to claim 10, wherein said movement vector operating means quantitatively detects the frame vibration in accordance with a representative point matching method.

17. An apparatus according to claim 10, wherein said correcting means is an optical correcting means.

18. An apparatus according to claim 10, wherein said correcting means includes an image memory and corrects the image movement by shifting an image read position of said image memory.

19. A movement vector detection apparatus comprising:
A) filter means for extracting a specific frequency component from an input image signal;
B) block size detecting means for deciding a block size corresponding to the specific frequency component extracted by said filter means; and
C) operating means for operating a movement vector from an output signal of said filter means, corresponding to the block size decided by said block size detecting means, on the basis of an image movement detection range corresponding to the specific frequency extracted by said filter means.

20. An apparatus according to claim 19, wherein said filter means is a band-pass filter.

21. An apparatus according to claim 20, wherein said band-pass filter decides an image movement detection range on the basis of a pattern period to be extracted and widens the image movement detection range.

22. An apparatus according to claim 21, wherein a passband of said band-pass filter is determined on the basis of an image movement frequency caused by hand vibration.

23. An apparatus according to claim 19, wherein said block size detecting means detects image movements at a plurality of positions of a frame and determines a block size for detecting an image movement from a movement distribution of the image movements at the plurality of positions.

24. An apparatus according to claim 19, wherein said operating means quantitatively detects the image vibration by a time and spatial gradient method.

25. An apparatus according to claim 19, wherein said operating means quantitatively detects the image vibration in accordance with a representative point matching method.

26. An apparatus according to claim 19, further including first correcting means for correcting a change in image brightness of the input image signal as a function of time.

27. An apparatus according to claim 19, further including second correcting means for correcting the image movement based on movement amount information output from said operating means.

28. An apparatus in which a frame is divided into a plurality of blocks to detect movement vectors in units of blocks, comprising:
A) feature extracting means for extracting a feature of an image from a plurality of locations in the frame;
B) block size control means for separately deciding sizes and shapes of a plurality of blocks in the frame in accordance with the feature extracted by said feature extracting means; and
C) vector operating means for detecting respective movement vectors of said plurality of blocks decided by said block size deciding means.

29. An apparatus according to claim 28, wherein said feature detecting means detects a state of the image and detects an image feature on the basis of a contrast component, an edge component and an oblique direction component of the image.

30. An apparatus according to claim 29, wherein said feature extracting means includes a band-pass filter.

31. An apparatus according to claim 30, wherein a passband of said band-pass filter is set to be a television signal band.

32. An apparatus according to claim 29, wherein said feature extracting means includes a circuit for detecting sharpness of the frame from the edge component of the image.

33. An apparatus according to claim 29, wherein said feature extracting means includes a circuit for detecting a spatial gradient of the image.

34. An apparatus according to claim 28, wherein said block size control means decides a size and a shape of a block in accordance with the image feature extracted by said feature extracting means.

35. An apparatus according to claim 34, wherein said block size control means decides a size and a shape of a block so as to correspond to a position in the frame in accordance with the image feature extracted by said feature extracting means.

36. An apparatus according to claim 35, wherein said block size control means divides the frame into a plurality of blocks and adaptively controls a size of each block.

37. An apparatus according to claim 28, wherein said vector operating means quantitatively detects image vibration in accordance with a time and spatial gradient method using the movement vector.

38. An apparatus according to claim 28, wherein said movement vector operating means quantitatively detects image vibration in accordance with a representative point matching method.

39. An apparatus according to claim 28, further including means for correcting an image movement based on the movement vector operated by said vector operating means.

40. An apparatus according to claim 39, wherein said correcting means is an optical correcting means for controlling a direction of an optical axis of an optical system.

41. An apparatus according to claim 39, wherein said correcting means includes image memory means for correcting movements of the image in a memory.

* * * * *

UNITED STATES PATENT AND TRADEMARK OFFICE
CERTIFICATE OF CORRECTION

PATENT NO. : 5,198,896
DATED : March 30, 1993
INVENTOR(S) : Toshiaki Kondo, Masayoshi Sekine It is certified that error appears in the above-identified patent and that said Letters Patent is hereby corrected as shown below:

Col. 6, line 1. Change "rime" to -- time --

Col. 9, line 54. Change "36" to -- 136 --

Col. 11, line 68. Change "a" to -- $\bar{a}$ --

Signed and Sealed this

First Day of February, 1994

Attest:

BRUCE LEHMAN

Attesting Officer

Commissioner of Patents and Trademarks